: 3,092,546
ANTIFUNGAL CYCLOHEXIMIDE STARCH INCLUSION COMPOSITIONS
Louis C. Schroeter and Gerald A. Boyack, Kalamazoo, Mich., assignors to The Upjohn Company, Kalamazoo, Mich., a corporation of Delaware
No Drawing. Filed Feb. 26, 1962, Ser. No. 175,795
10 Claims. (Cl. 167—42)

This invention relates to novel compositions containing cycloheximide and is more particularly concerned with stabilized cycloheximide compositions and with a process for their preparation.

Cycloheximide ($\beta$-[2-(3,5-dimethyl-2-oxocyclohexyl)-2-hydroxyethyl]-glutarimide) is an antibiotic substance, produced as an elaboration product of *Streptomyces griseus* according to the procedures set forth in U.S. Patents 2,574,519 and 2,612,502. It has been shown to be highly useful for the control of plant fungal infections such as cherry leaf spot, wheat rust, bean anthracnose, rose powdery mildew, turf diseases (e.g., melting-out, fading-out, dollar-spot, large brown patch, and Pythium-caused diseases), and the like.

In general cycloheximide is marketed and supplied to the user for the above purposes as a solid composition which is diluted with water to form an aqueous solution before use. Unfortunately it has been found that cycloheximide is relatively unstable when maintained for long periods in contact with a wide variety of organic materials. Included amongst organic materials with which cycloheximide is incompatible when stored over long periods are many of the surfactants commonly used in horticultural compositions, particularly the solubilized lignins which are commonly employed in combination with cycloheximide to reduce the phytotoxicity of the latter. Further, a number of other fungicidal agents such as pentachloronitrobenzene, thiram, captan, and the like, when stored in the solid state in contact with cycloheximide, cause gradual deterioration of the latter.

Indeed, it has sometimes been the practice to market cycloheximide in a dual-package composition, one package containing the cycloheximide and the other package containing the components of the composition which are incompatible with the cycloheximide. The contents of the two packages are mixed immediately prior to use, usually by adding them to the requisite amount of water to form the desired fungicidal formulation ready for use. The dual-package method of marketing is obviously wasteful and time-consuming.

The present invention makes it possible to eliminate the dual-package composition and enables cycloheximide to be stored for long periods of time in contact with organic materials with which it is normally incompatible.

The present invention consists, in its broadest aspect, in a process for the stabilization of cycloheximide against deterioration due to contact with materials with which it is incompatible when stored, which process comprises mixing said cycloheximide with an aqueous dispersion of starch and drying the dispersion so obtained to form a dry, solid cycloheximide-starch inclusion compound. The cycloheximide-starch inclusion compound so obtained can then be incorporated in solid fungicidal compositions in association with adjuvants such as surfactants, for example, solubilized lignins and the like, and/or with other fungicidally effective materials such as pentachloronitrobenzene, captan, thiram, and the like, with which cycloheximide is normally incompatible on storage for prolonged periods. When the solid fungicidal composition so produced is added to water before use, the cycloheximide-starch inclusion compound dissociates and the resulting composition has fungicidal properties equivalent to those of a composition containing the same proportion of free cycloheximide.

Further, the cycloheximide-starch inclusion compound so obtained is relatively free from production of dermatitis which is normally caused when pure cycloheximide comes into contact with the skin. Hence, in addition to its usefulness in formulation, as mentioned above, the cycloheximide-starch inclusion compound produced according to the present invention is useful per se, since it is much easier to handle on the large scale as it presents much less of a toxicity problem than cycloheximide itself.

In carrying out the process of the invention it has been found possible to employ a wide variety of forms of starch. The term "starch" is employed throughout the specification and claims as having its normally accepted meaning as generic to naturally occurring starches and physically or chemically modified starches. Thus, the following forms of starch are representative of those which can be employed in the process of the invention:

(A) Unmodified starches obtained directly from plant sources such as corn, potato, tapioca, wheat, sago, sweet potato, rice, soyabean, and the like, by separating the extraneous matter from the particular grain by conventional manufacturing procedures.

(B) Modified starches such as:
 (1) Pregelatinized starches, i.e., natural starches which have been gelatinized by heating with water followed by drying of the gel;
 (2) The torrefaction or roasted dextrins obtained by heating natural starches (e.g., British gum) or by heating natural starches after partial acid hydrolysis (e.g., white or canary dextrin);
 (3) Thin-boiling, acid-modified starches which have been obtained by partial hydrolysis of natural starches using mineral acids;
 (4) Thin-boiling oxidized starches which have been obtained by treating natural starches with oxidizing agents such as hypochlorite or hydrogen peroxide;
 (5) Etherified starches including the hydroxyethyl, hydroxypropyl, methyl and ethyl ethers;
 (6) Esterified starches such as acetylated starches or the commercially available products described as mixed carboxylic and sulfonic esters of corn starch;
 (7) The so-called soluble starches obtained by fractionation of natural starches;
 (8) The enzymatically modified starches such as the cyclodextrins.

In addition, combinations of two or more of the above forms of starch can be employed in the preparation of the cycloheximide-starch inclusion compounds of the present invention.

The preparation of the cycloheximide-starch inclusion compounds of the invention is accomplished by (1) preparing an aqueous dispersion of the desired starch, if necessary by heating the starch in aqueous medium to elevated temperatures, and admixing the cycloheximide with the dispersion so obtained after cooling the latter, if necessary, to approximately 25° C. to 35° C., and (2) drying the resulting mixture. The term "aqueous dispersion" means that the dispersion medium employed is water alone or is principally water plus minor amounts of water-miscible, readily volatile solvents such as acetone, methanol, ethanol, isopropyl alcohol, and the like.

The aqueous dispersion of the starch is prepared in as concentrated a form as possible in order to reduce the volume of liquid to be handled. This is of particular importance when operating on the large scale. Hence, while any of the above-mentioned starches can be employed in the process of the invention, it is preferred to employ a starch which has a relatively high dispersibility in water. For this reason the so-called soluble starches produced by fractionation or acid hydrolysis of natural starches are particularly desirable for use.

The aqueous mixture of cycloheximide and starch prepared as described above is then subjected to drying. The drying operation can be accomplished by any of the known procedures such as simple evaporation at room temperature or elevated temperatures, or by spray-drying or drum-drying using conventional apparatus. The resulting dry product can then be comminuted, if desired, to achieve a product having any required particle size.

In order to achieve satisfactory stabilization of cycloheximide under storage conditions such as those set forth above, it has been found necessary to employ a ratio of cycloheximide to starch in the above process such that the cycloheximide-starch inclusion compound obtained contains not more than 40% by weight of cycloheximide. Advantageously the amount of cycloheximide in the cycloheximide-starch inclusion compound is within the range of about 5% to about 40% by weight. Preferably the amount of cycloheximide in the inclusion compound is within the range of about 5% to about 30% by weight.

The cycloheximide-starch inclusion compound so obtained can then be incorporated in solid fungicidal compositions in place of cycloheximide itself, using procedures well-known in the art. Said compositions can, if desired, incorporate other fungicidal and like agents such as captan, thiram, pentachloronitrobenzene, and the like. The resulting compositions containing the cycloheximide-starch inclusion compound are found to be relatively stable on storage for many months whereas corresponding compositions in which the cycloheximide-starch inclusion compound is replaced by cycloheximide in many cases show substantial loss of cycloheximide activity after relatively short periods of storage.

The beneficial effect of the use of a cycloheximide-starch inclusion compound on the storage properties of solid cycloheximide compositions is graphically illustrated by the results observed with compositions containing a combination of cycloheximide and pentachloronitrobenzene. The latter compound, especially when not carefully purified, shows a tendency to decompose on storage. However, it has now been found that by converting cycloheximide to a cycloheximide-starch inclusion compound and using the latter in combination with pentachloronitrobenzene it is possible to prepare compositions which are stable on storage for prolonged periods. The following series of experiments demonstrates the advantages of using cycloheximide-starch inclusion compounds in combination with pentachloronitrobenzene.

A series of cycloheximide-starch inclusion compounds using different varieties of starch were prepared using the following procedures. These procedures also serve as examples of the manner in which the process of the invention can be carried out.

PREPARATION 1

*Cycloheximide-Soluble Starch Inclusion Compound*

A mixture of 840 g. of soluble starch (No. S–516, Fisher Scientific Company; contains 30% amylose and 70% amylopectin; produced by extracting potato starch with water and precipitating with butanol) and 3000 ml. of water was stirred and heated at the boiling point for 5 minutes. The solution was cooled to 25° C. and was then mixed with 84 g. of cycloheximide in a high-speed mixer (Waring Blendor). The resulting mixture was spray-dried using a sprayer air-pressure of 40 to 50 p.s.i. and an air temperature of 150° to 190° F. at the outlet. There was thus obtained cycloheximide-soluble starch inclusion compound assaying 8.6% by weight of cycloheximide. This material was passed through a 40-mesh screen.

The above procedure was repeated using varying quantities of cycloheximide to obtain cycloheximide-soluble starch inclusion compounds containing different ratios of cycloheximide to starch.

PREPARATION 2

*Cycloheximide-Household Starch Inclusion Compound*

A mixture of 183 g. of untreated household starch (Argo starch; Corn Products Company) and 3500 ml. of water was boiled for 5 minutes. The solution was cooled to 25° C. and was then mixed with 45.7 g. of cycloheximide using a Waring Blendor. The resulting mixture was spray-dried using a sprayer air-pressure of 40 to 50 p.s.i. and an air temperature of 150° to 190° F. at the outlet. There was thus obtained cycloheximide-household starch inclusion compound assaying 19% by weight of cycloheximide. This material was passed through a 40-mesh screen.

Using the above procedure but varying the amount of cycloheximide, there were obtained cycloheximide-household starch inclusion compounds containing varying proportions of cycloheximide.

PREPARATION 3

*Cycloheximide-Soluble Starch (Acid Modified) Inclusion Compound*

A mixture of 620 g. of soluble starch (Niagara soluble starch, Corn Products Company; produced by hydrochloric acid hydrolysis of corn starch) and 3500 ml. of water was heated at the boiling point for 5 minutes. The solution was cooled to 25° C. and was then mixed with 155 g. of cycloheximide in a Waring Blendor. The mixture so obtained was spray-dried using a sprayer air-pressure of 40 to 50 p.s.i. and an air temperature of 150° to 190° F. at the outlet. There was thus obtained cycloheximide-soluble starch inclusion compound assaying 19% by weight of cycloheximide.

Using the above procedure but varying the amount of cycloheximide, there were obtained cycloheximide-soluble starch inclusion compounds containing varying proportions of cycloheximide.

PREPARATION 4

*Cycloheximide-Amylose Inclusion Compound*

630 g. of stabilized amylose solution (Superlose Solution, Stein Hall and Co., Inc.; contains 20% of amylose) was diluted to 4 l. with water. To this solution was added 84 g. of cycloheximide and the mixture was stirred until solution was effected. The resulting solution was spray-dried using a sprayer air-pressure of 50 p.s.i. and an air temperature of 160° F. at the outlet. There was thus obtained cycloheximide-amylose inclusion compound assaying 39% by weight of cycloheximide.

Using the above procedure but varying the amount of cycloheximide, there were obtained cycloheximide-amylose inclusion compounds containing varying proportions of cycloheximide.

PREPARATION 5

*Cycloheximide-Amylopectin Inclusion Compound*

336 g. of amylopectin (Ramalin G; Stein Hall and Co., Inc.) was dissolved in 4 l. of water with stirring. To this solution was added 84 g. of cycloheximide and stirring was continued until solution was effected. The resulting solution was spray-dried using a sprayer air-pressure of 50 p.s.i. and an air temperature of 190° F. at the outlet. There was thus obtained cycloheximide-amylopectin inclusion compound assaying 22% by weight of cycloheximide.

Using the above procedure but varying the amount of cycloheximide, there were obtained cycloheximide-amylopectin inclusion compounds containing varying proportions of cycloheximide.

PREPARATION 6

*Cycloheximide-Hydroxyethyl Amylose Inclusion Compound*

336 g. of hydroxyethyl amylose (Superlose HAA–11–HV; Stein Hall and Co., Inc.) was dissolved in 4 l. of water. To this solution was added 84 g. of cycloheximide and the mixture was stirred until solution was complete. The resulting solution was spray-dried using a sprayer air-pressure of 50 p.s.i. and an air temperature of 170° F. at the outlet. There was thus obtained cycloheximide-hydroxyethyl amylose inclusion compound assaying 25% by weight of cycloheximide.

Using the above procedure but varying the amount of cycloheximide, there were obtained cycloheximide-hydroxyethyl amylose compounds containing varying proportions of cycloheximide.

PREPARATION 7

*Cycloheximide-Soluble Starch Inclusion Compound*

A mixture of 50 g. of soluble starch (Fisher Scientific Company) and 100 ml. of water was heated on a steam bath to produce a uniform, smooth paste which was then cooled to about 40° C. A suspension of 10 g. of cycloheximide in 50 ml. of water was intimately mixed with the paste. The resulting paste was spread in a thin layer in a silicone-coated tray and allowed to dry at about 25° C. There was thus obtained cycloheximide-soluble starch inclusion compound assaying 173 micrograms of cycloheximide per milligram (theory, 166 micrograms per milligram).

Representative cycloheximide-starch inclusion compounds obtained as described above were formulated as wettable powders in the following manner.

A stock supply of a pentachloronitrobenzene-surfactant mixture having the following percentage composition by weight was prepared by air-milling the following ingredients:

|   | Percent |
|---|---|
| Pentachloronitrobenzene | 98.06 |
| Daxad 27 (sodium salt of a substituted arylalkylsulfonic acid combined with inert inorganic suspending agent) | 1.29 |
| Triton X–100 (isooctyl phenoxy polyethoxyethanol) | 0.65 |

Appropriate amounts of pyrophyllite, cycloheximide-starch inclusion compounds of the invention, and portions of the above stock supply were uniformly mixed by tumbling, so as to produce a series of wettable powders, each containing 75% by weight of pentachloronitrobenzene and 1.32% by weight of cycloheximide.

Each of the wettable powders so obtained was then sealed in an air-tight glass container and stored at room temperature (ca. 25° C.) or in constant-temperature containers maintained at 47° C., 40° C. and 0° C. At time zero, i.e., immediately after making up the mixture, and at time intervals of several weeks thereafter, samples of the mixtures were withdrawn and assayed for cycloheximide. The assay was carried out by diluting a weighed amount of the sample with water and subjecting the aqueous solution to assay for cycloheximide using the method of Whiffen (J. Bact. 56, 283, 1948).

A composition of cycloheximide and pentachloronitrobenzene prepared as described above but using an equivalent amount of free cycloheximide in place of the cycloheximide-starch inclusion compound was employed as control in the experiment.

The results obtained are recorded in the following table.

TABLE.—STABILITY OF CYCLOHEXIMIDE : PENTACHLORONITROBENZENE COMPOSITIONS

| Starch Type | Percent cycloheximide in starch inclusion cmpd. | Time stored (weeks) | Storage Temperature (° C.) | Cycloheximide Assay | |
|---|---|---|---|---|---|
| | | | | mcg./mg. | Percent loss |
| Control (no starch) | 100 | 0 | -------- | 13.9 | 0 |
| | | 7 | 40 | <5.1 | >63 |
| | | 31 | ca. 25 | 6.6 | 52.5 |
| | | 74 | ca. 25 | <0.8 | >94 |
| Fisher Soluble | 17.6 | 0 | -------- | 15.1 | 0 |
| | | 4 | 47 | 16.3 | 0 |
| | | 8 | ca. 25 | 13.6 | 10 |
| | | 26 | ca. 25 | 12.5 | 20.8 |
| | | 31 | <0 | 11.7 | 22.5 |
| | | 74 | ca. 25 | 10.7 | 29.1 |
| Fisher Soluble | 4.2 | 0 | -------- | 14.6 | 0 |
| | | 4 | 47 | 13.2 | 9.6 |
| | | 7 | 40 | 14.0 | 4.1 |
| | | 8 | ca. 25 | 12.7 | 13.0 |
| | | 26 | ca. 25 | 10.7 | 26.7 |
| | | 74 | ca. 25 | 8.1 | 44.5 |
| Fisher Soluble | 9.1 | 0 | -------- | 14.7 | 0 |
| | | 7 | ca. 25 | 12.7 | 13.6 |
| | | 16 | ca. 25 | 15.0 | 0 |
| | | 47 | ca. 25 | 8.4 | 43.0 |
| Fisher Soluble | 23.1 | 0 | -------- | 14.7 | 0 |
| | | 7 | ca. 25 | 12.2 | 17 |
| | | 16 | ca. 25 | 15.5 | 0 |
| | | 47 | ca. 25 | 9.98 | 32 |
| Fisher Soluble | 28.6 | 0 | -------- | 15.0 | 0 |
| | | 16 | ca. 25 | 13.0 | 13.6 |
| | | 47 | ca. 25 | 9.95 | 33.6 |
| Niagara Soluble | 20 | 0 | -------- | 15.3 | 0 |
| | | 16 | ca. 25 | 13.7 | 10.5 |
| | | 16 | <0 | 16.8 | 0 |
| | | 47 | ca. 25 | 10.49 | 31.4 |
| Argo Household | 20 | 0 | -------- | 15.3 | 0 |
| | | 7 | 40 | 13.8 | 9.8 |
| | | 7 | ca. 25 | 13.7 | 9.8 |
| | | 16 | ca. 25 | 15.7 | 0 |
| | | 47 | ca. 25 | 13.1 | 14.3 |
| Stabilized Amylose (Superlose) | 40 | 0 | -------- | 13.7 | 0 |
| | | 34 | ca. 25 | 8.26 | 39.6 |
| Amylopectin (Ramalin G) | 20 | 0 | -------- | 13.8 | 0 |
| | | 34 | ca. 25 | 8.53 | 38 |
| Hydroxyethyl Amylose | 20 | 0 | -------- | 13.6 | 0 |
| | | 24 | ca. 25 | 9.84 | 27.6 |

The formulation of combinations of the cycloheximide-starch inclusion compounds and pentachloronitrobenzene according to the invention is carried out using procedures and adjuvants well-known in the art. The compositions are dry, solid, water-dispersible compositions which comprise the cycloheximide-starch inclusion compound, pentachloronitrobenzene, and a surfactant. Other adjuvants such as stickers, inert solid diluents, for example, diatomaceous earth, talc, pyrophyllite, diatomite, bentonite, Georgia clay, Attapulgus clay, and the like, can also be present, if desired, in the compositions.

As surfactants in the above compositions, there can be used any of the conventional wetting and dispersing agents of the anionic, cationic, and nonionic types commonly employed in agricultural compositions. Suitable surfactants having sufficient wetting activity for the purposes of this invention include alkyl sulfates and sulfonates, alkylbenzenesulfonates, sulfosuccinate esters, polyoxyethylene sulfates, polyoxyethylene sorbitan monolaurate, alkylarylpolyether sulfates, alkylarylpolyether alcohols, alkylnaphthalenesulfonates, alkyl quaternary ammonium salts, sulfated fatty acid esters, sulfated fatty acid amides, glycerol mannitan laurate, polyalkyl ether condensates of fatty acids, and lignin sulfonates, the sulfates and sulfonates preferably being used in the form of their soluble salts, for example, the sodium salts. All of these surfactants are capable of reducing the surface tension of water to less than about 40 dynes per centimeter in concentrations of about 1% or less.

The amount of cycloheximide (in the form of a starch inclusion compound) present in said compositions is advantageously within the range of about 0.0004 to about 10.0% by weight, and preferably within the range of about 0.02 to about 5.0% by weight. The amount of pentachloronitrobenzene present in said compositions is advantageously within the range of about 1.0 to about 85.0% by weight.

A further aspect of the present invention is concerned with the stabilization of cycloheximide when stored in combination with thiram (tetramethylthiuram disulfide). The following compositions were prepared by mixing the following ingredients.

| Composition A: | Percent |
|---|---|
| Thiram | 75 |
| Cycloheximide | 0.75 |
| Daxad 27 | 2.0 |
| Barden clay | 22.25 |
| Composition B: | |
| Thiram | 75 |
| Cycloheximide-soluble starch (Fisher) inclusion compound (4.5% by wt. of cycloheximide) | 16.6 |
| Daxad 27 | 2.0 |
| Barden clay | 6.4 |

Both of compositions A and B were placed in stoppered glass containers and assayed for cycloheximide content immediately after preparation and again approximately 35 weeks after preparation, said compositions having been stored at room temperature (approximately 25° C.) during the interval. After 35 weeks' storage under these conditions composition A was found to have lost 28.8% of the original cycloheximide potency while composition B had lost only 4% of the original cycloheximide potency.

The compositions of the invention containing a combination of cycloheximide and thiram, the cycloheximide being present as a starch inclusion compound, can be prepared by conventional procedures. Said compositions comprise thiram, cycloheximide-starch inclusion compound, and a surfactant. Additional adjuvants such as stickers and inert solid diluents, as hereinbefore defined, can be present if desired. The surfactants employed in said compositions are preferably of the type defined hereinbefore. The amount of cycloheximide (in the form of a cycloheximide-starch inclusion compound) present in the said compositions is advantageously within the range of about 0.0004 to about 10.0% by weight, and preferably within the range of about 0.05 to about 2.0% by weight. The amount of thiram present in the said compositions is advantageously within the range of about 1.0 to about 90% by weight.

We claim:

1. A solid cycloheximide-starch inclusion compound wherein the cycloheximide is present in the proportion of from about 5 to about 40% by weight.

2. A process for producing a solid stabilized cycloheximide composition which comprises admixing cycloheximide with an aqueous dispersion of starch, the amount of starch in the dispersion being in the proportion of from about 1.5 to about 19 parts by weight for each part of cycloheximide, and drying the resulting mixture.

3. In a process for formulating cycloheximide in a solid agricultural composition in association with at least one other material with which cycloheximide is normally incompatible, the improvement which comprises employing cycloheximide in the form of a cycloheximide-starch inclusion compound containing cycloheximide in the proportion of from about 5 to about 40% by weight.

4. A solid, stabilized agricultural composition comprising cycloheximide in association with at least one other material with which cycloheximide is normally incompatible, characterized in that the cycloheximide is present in the form of a cycloheximide-starch inclusion compound containing cycloheximide in the proportion of from about 5 to about 40% by weight.

5. A solid fungicidal composition comprising cycloheximide and pentachloronitrobenzene as active ingredients in association with fungicidal adjuvants, characterized in that the cycloheximide is present in the form of a cycloheximide-starch inclusion compound containing cycloheximide in the proportion of from about 5 to about 40% by weight.

6. The composition of claim 5 wherein the starch employed in preparing the cycloheximide-starch inclusion compound is soluble starch.

7. In a process for formulating cycloheximide in a solid fungicidal composition in association with pentachloronitrobenzene and fungicidal adjuvants, the improvement which comprises pretreating the cycloheximide by admixing the latter with an aqueous dispersion of starch, the amount of starch in the dispersion being in the proportion of from about 1.5 to about 19 parts by weight for each part by weight of cycloheximide, drying the resulting mixture, and using the cycloheximide-starch inclusion compound so obtained in the subsequent formulation thereof.

8. A solid fungicidal composition comprising cycloheximide and tetramethylthiuram disulfide as active ingredients in association with fungicidal adjuvants, characterized in that the cycloheximide is present in the form of a cycloheximide-starch inclusion compound containing cycloheximide in the proportion of from about 5 to about 40% by weight.

9. The composition of claim 8 wherein the starch employed in preparing the cycloheximide-starch inclusion compound is soluble starch.

10. In a process for formulating cycloheximide in a solid fungicidal composition in association with tetramethylthiuram disulfide and fungicidal adjuvants, the improvement which comprises pretreating the cycloheximide by admixing the latter with an aqueous dispersion of starch, the amount of starch in the dispersion being in the proportion of from about 1.5 to about 19 parts by weight for each part by weight of cycloheximide, drying the resulting mixture, and using the cycloheximide-starch inclusion compound so obtained in the subsequent formulation thereof.

References Cited in the file of this patent

UNITED STATES PATENTS

| 2,613,206 | Caldwell | Oct. 7, 1952 |
| 2,614,945 | Krisan | Oct. 21, 1952 |
| 2,786,011 | Novak | Mar. 19, 1957 |
| 2,827,452 | Schlenk et al. | Mar. 18, 1958 |
| 2,861,024 | Silver | Nov. 18, 1958 |
| 2,876,160 | Schoch et al. | Mar. 3, 1959 |
| 2,876,165 | Novak | Mar. 3, 1959 |
| 2,887,433 | Swank | May 19, 1959 |
| 2,913,372 | Velde et al. | Nov. 17, 1959 |
| 2,956,922 | Garber et al. | Oct. 18, 1960 |
| 2,992,161 | Flenner | July 11, 1961 |
| 2,997,423 | Novak | Aug. 22, 1961 |
| 3,025,217 | Bernstein et al. | Mar. 13, 1962 |

OTHER REFERENCES

Cramer, F. D.: "Inclusion Compounds," Reviews of Pure and Applied Chemistry, vol. 5, No. 3, pp. 143–164, September 1955.